(12) United States Patent
Glock (10) Patent No.: US 11,851,779 B2
(45) Date of Patent: Dec. 26, 2023

(54) ELECTROLYTIC CELL

(71) Applicant: GLOCK ÖKOENERGIE GMBH, Griffen (AT)

(72) Inventor: Gaston Glock, Velden (AT)

(73) Assignee: GLOCK ÖKOENERGIE GMBH, Griffen (AT)

( * ) Notice: Subject to any disclaimer, the term of this patent is extended or adjusted under 35 U.S.C. 154(b) by 269 days.

(21) Appl. No.: 17/298,868

(22) PCT Filed: Jan. 21, 2020

(86) PCT No.: PCT/EP2020/051410
§ 371 (c)(1),
(2) Date: Jun. 1, 2021

(87) PCT Pub. No.: WO2020/169293
PCT Pub. Date: Aug. 27, 2020

(65) Prior Publication Data
US 2022/0251720 A1    Aug. 11, 2022

(30) Foreign Application Priority Data
Jan. 22, 2019   (EP) .................................... 19158862

(51) Int. Cl.
| | | |
|---|---|---|
| *C25B 9/63* | (2021.01) |
| *C25B 9/015* | (2021.01) |
| *C25B 9/70* | (2021.01) |
| *C25B 9/17* | (2021.01) |
| *C25B 1/04* | (2021.01) |
| *C25B 15/08* | (2006.01) |
| *C25B 11/02* | (2021.01) |
| *C25B 9/01* | (2021.01) |

(52) U.S. Cl.
CPC .................. *C25B 9/63* (2021.01); *C25B 1/04* (2013.01); *C25B 9/01* (2021.01); *C25B 9/015* (2021.01); *C25B 9/17* (2021.01); *C25B 9/70* (2021.01); *C25B 11/02* (2013.01); *C25B 15/08* (2013.01)

(58) Field of Classification Search
CPC ...................... C25B 11/02; C25B 1/04–1/044
USPC ..................... 205/628, 630; 123/3
See application file for complete search history.

(56) References Cited

U.S. PATENT DOCUMENTS

| | | | | |
|---|---|---|---|---|
| 4,002,552 A | * | 1/1977 | Bunn, Jr. .................. | C25B 9/05 204/266 |
| 4,099,489 A | * | 7/1978 | Bradley ................ | F01K 25/005 123/3 |

(Continued)

FOREIGN PATENT DOCUMENTS

CN         201678736 U      12/2010

OTHER PUBLICATIONS

Search Report in corresponding application EP 19158862.3-1108.

*Primary Examiner* — Harry D Wilkins, III
(74) *Attorney, Agent, or Firm* — Raven Patents, LLC; Anton E. Skaugset (57) ABSTRACT

Electrolytic cells for electrolysis of water, the electrolytic cells including two sub-cells, one containing the anode, the other the cathode. The electrolytic cells are configured so that at least the hydrogen formed due to electrolysis is passed through a deflection tube and into an electrolyte outside of the electrolytic sub-cell. This configuration serves as a security measure to prevent a flashback of a combustion reaction, and makes the presence of a separate bubbler superfluous.

12 Claims, 5 Drawing Sheets

(56) References Cited

U.S. PATENT DOCUMENTS

| | | | |
|---|---|---|---|
| 5,196,104 A | 3/1993 | Munday | |
| 5,272,871 A | 12/1993 | Oshima | |
| 5,843,292 A * | 12/1998 | Spiros | F23D 14/38 |
| | | | 204/267 |
| 6,332,434 B1 | 12/2001 | De Souza | |
| 2004/0108203 A1* | 6/2004 | Sullivan | C25B 9/23 |
| | | | 204/276 |
| 2008/0283392 A1* | 11/2008 | Karabin | C25B 1/04 |
| | | | 204/253 |
| 2010/0025258 A1* | 2/2010 | Lindsay | C25B 1/04 |
| | | | 205/335 |
| 2010/0206721 A1 | 8/2010 | Snidvongs | |
| 2012/0058405 A1 | 3/2012 | Kirchoff | |
| 2014/0202878 A1* | 7/2014 | Greenbaum | C25B 11/02 |
| | | | 29/623.2 |
| 2015/0034479 A1* | 2/2015 | Pan | C25B 11/00 |
| | | | 204/278 |

* cited by examiner

ELECTROLYTIC CELL

TECHNICAL FIELD

This disclosure relates to electrolytic cells, particularly to electrolytic cells for the electrolytic decomposition of water to hydrogen and oxygen, and more particularly to electrolytic cells for use in motor vehicles to provide hydrogen for fuel.

BACKGROUND

There have long been efforts to increase the efficiency of internal combustion engines, more particularly diesel engines, by adding hydrogen, and at the same time to reduce the emission of harmful exhaust gases, more particularly nitrogen oxides. Since providing and carrying a sufficiently voluminous hydrogen tank in the motor vehicle is complex and therefore costly and also dangerous, due to the properties of the high pressure or even liquified hydrogen, various proposals have already been made to obtain the hydrogen from water through electrolysis while the motor vehicle is in operation, the electricity required for this being generated by the internal combustion engine via a connected generator, preferably the generator that is already present.

A good early general example of this is provided by U.S. Pat. No. 5,272,871. An electrolytic cell which can be used to generate hydrogen for use in internal combustion engines is also known from U.S. Pat. No. 6,332,434. Substantially, however, this publication does not deal with the structure of the electrolytic cell, but rather with the open or closed loop control, depending on the operating state of the vehicle.

Chinese utility model CN 201678736 U discloses an electrolytic cell for use in a motor vehicle, where liquid water is dissociated into gaseous oxygen and hydrogen, and the gases are diverted to protect against the flashback of a flame by their own vessel, an "external gas scrubber." This external vessel requires space and pipes must be provided to connect the actual electrolytic cell to the vessel.

Publication US 2012/058405 A1 discloses an acoustically activated electrolytic cell that provides the electrodes with their own covers in order to divert the gases formed and probably also to prevent turbulence in the liquid as a result of sonochemical activation.

From U.S. Pat. No. 5,196,104 A, it is known to feed the gases in a turbine operated with hydrogen and oxygen for safety reasons through an inverted gas siphon.

U.S. Pat. Nos. 5,272,871; 6,332,434; 5,196,104; and patent publication no. US 2012/058405 are hereby incorporated by reference.

What is needed is an electrolytic cell can withstand the mechanical stresses that it would be exposed to while driving, but that is additionally adapted for use in a motor vehicle, i.e. that is flexible in its shape, but in principle compact, requires little space, and has few components, and can also work reliably and with high efficiency in the wide temperature range in which it may be used.

SUMMARY

The present disclosure is directed to electrolytic cells for the electrolysis of liquid water to form gaseous hydrogen and oxygen gas. In particular, the disclosure is directed to such electrolytic cells for use in motor vehicles.

The disclosure may include electrolytic cells for electrolytic decomposition of water into gaseous hydrogen and oxygen that include: An electrolytic cell housing in which an amount of electrolyte liquid having a liquid level is disposed, where a connection to an electrolyte liquid supply is provided in a bottom region of the electrolytic cell housing, and where the electrolytic cell housing is divided by a partition into two partial electrolytic cells; an open or closed loop control device for regulating the amount of the electrolyte liquid in the electrolytic cell housing; a cathode disposed in a first electrode housing, the first electrode housing being arranged in one of the partial electrolytic cells; an anode disposed in a second electrode housing, the second electrode housing being arranged in the other of the partial electrolytic cells; such that at least the first electrode housing is coupled at its uppermost portion to an inverted gas siphon having an outlet opening; where the open or closed loop control device is configured to regulate the amount of electrolyte liquid in the electrolytic cell housing so that the outlet opening of the inverted gas siphon is held completely below the liquid level of the electrolyte liquid; and the electrolytic cell housing includes separate gas outlets for evolved hydrogen and oxygen gases, and each gas outlet is arranged at a vertical distance above the liquid level of the electrolyte liquid.

The features, functions, and advantages of the disclosed electrolytic cells may be achieved independently in various embodiments of the present disclosure, or may be combined in yet other embodiments, further details of which can be seen with reference to the following description and drawings.

DETAILED DESCRIPTION

Figure 1:
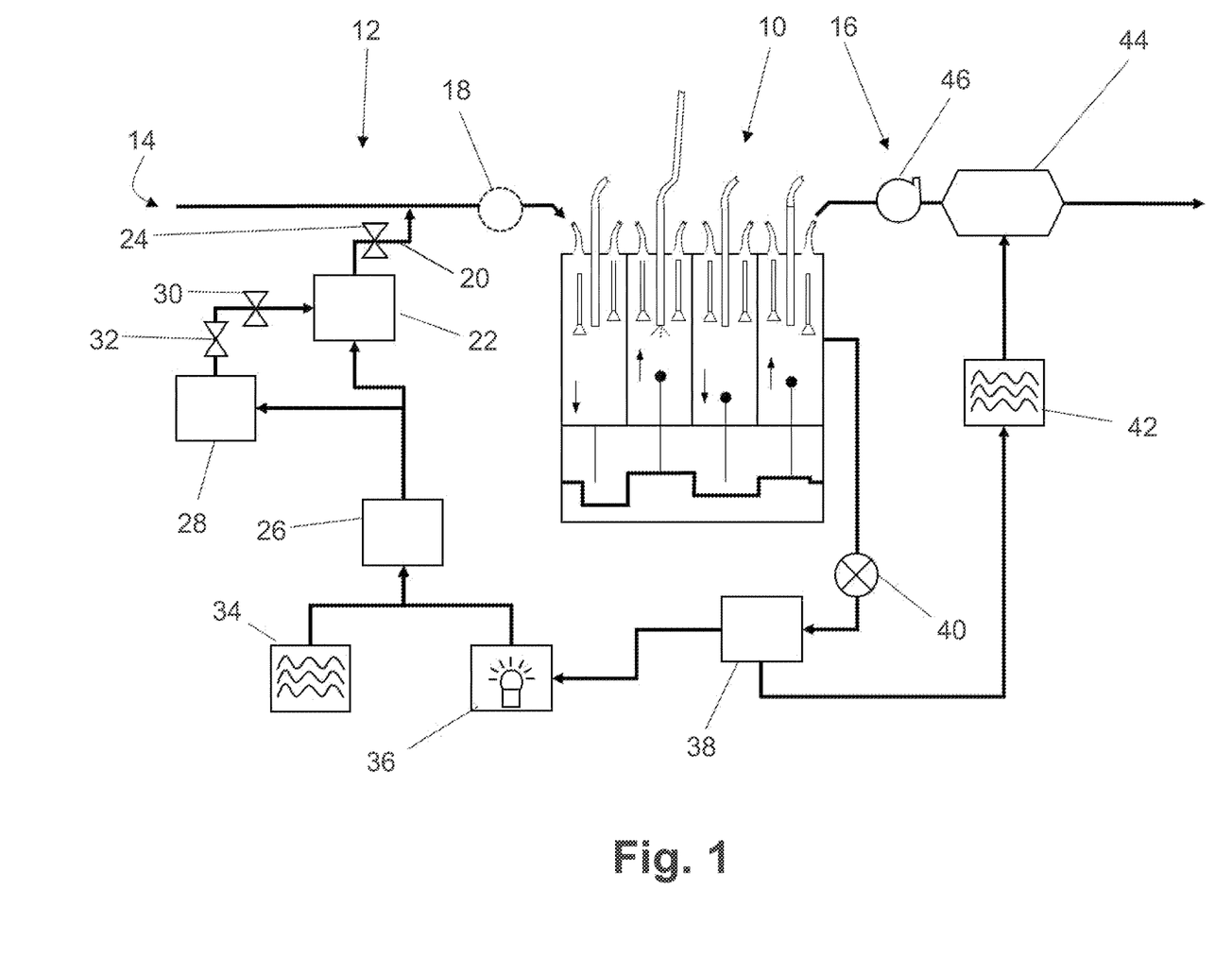
FIG. 1 is a schematic diagram showing an exemplary arrangement of an electrolytic cell in interaction with an internal combustion engine.

FIG. 1 schematically depicts an internal combustion engine 10 for a motor vehicle that is fueled by hydrogen generated by an electrolytic cell according to the present disclosure. Engine 10 can have an intake tract 12 to supply ambient air 14 to the engine, and an exhaust tract 16 for releasing exhaust gases. Intake tract 12 can incorporate, but is not required to incorporate, a turbocharger 18. A hydrogen supply pipe 20 is configured to supply hydrogen gas to intake tract 12 from an onboard hydrogen supply 22. Hydrogen supply pipe 20 can be coupled to intake tract 12 upstream of turbocharger 18 (when present). In addition, hydrogen supply pipe 20 can include one or more check valves 24 inline prior to intake tract 12, the check valves 24 serving to prevent the ingress of air or other gases from intake tract 12 into hydrogen supply 22.

Hydrogen can be provided to hydrogen supply 22 directly from an electrolytic cell 26 and/or a hydrogen buffer tank 28, which is supplied from electrolytic cell 26. Hydrogen buffer tank 28 can be used to supply hydrogen to engine 10 when starting, if hydrogen is needed for the initial operation of the engine. Hydrogen buffer tank 28 can be connected to hydrogen supply 22 via one or both of a flow regulator 30 and a pressure reducer 32.

Electrolytic cell 26 is associated with an electrolyte supply 34 and a power supply 36. Power supply 36 can be a battery, for example, or an alternator of the motor vehicle. An open or closed loop control device 38 can be configured to control power supply 36 as a function of data obtained from a tachometer 40, and/or possibly the general electronics responsible for engine management, in order to provide a required amount of hydrogen to the engine. Control device 38 can also regulate, among other things, the delivery of urea from a urea solution tank 42 to a catalytic converter 44, which is disposed in exhaust tract 16 downstream from an oxygen sensor (or lambda probe) 46.

Figure 2:
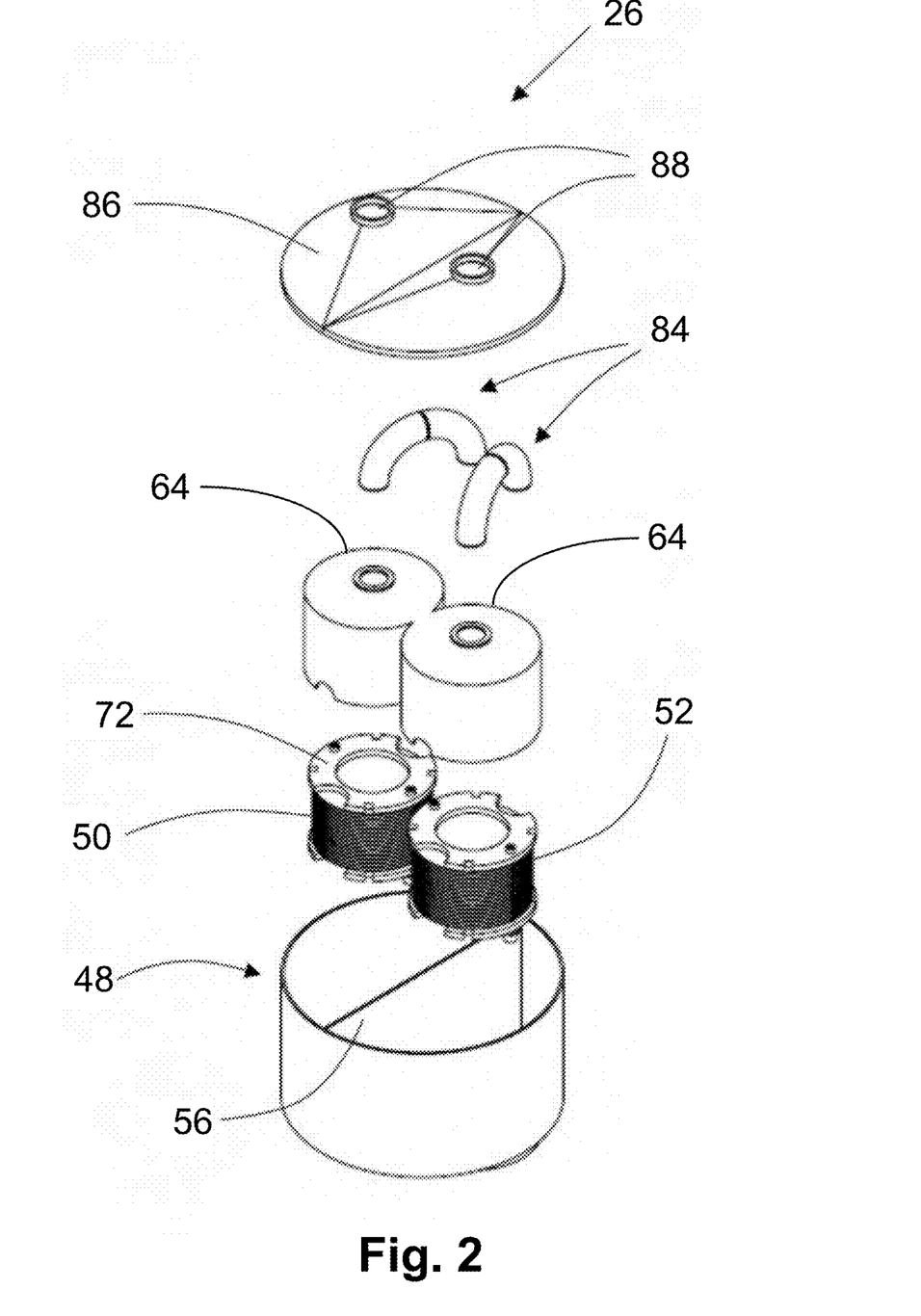
FIG. 2 depicts an illustrative example of an electrolytic cell according to the present disclosure in an exploded view.

In FIG. 2, electrolytic cell 26 is shown in more detail in an exploded view. Electrolytic cell 26 includes an electrolytic cell housing 48, which also performs the function of a bubble tank. Electrolytic cell housing 48 includes a pair of electrodes referred to as a cathode 50, and an anode 52, each electrode preferably having the same construction.

Figure 3:
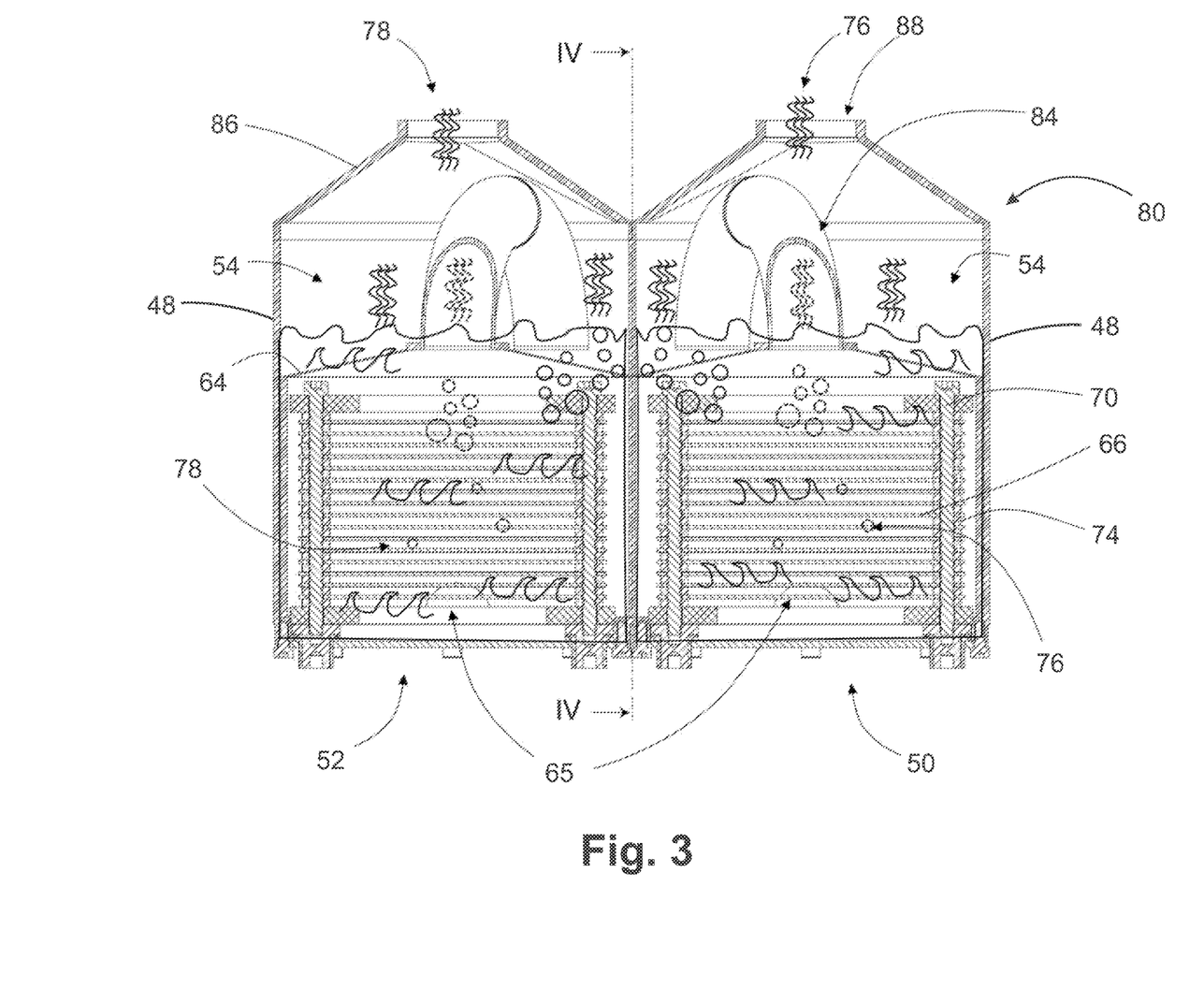
FIG. 3 is a vertical sectional view an exemplary electrolytic cell according to the present disclosure, as shown indicated by line III-III of FIG. 4.
Figure 4:
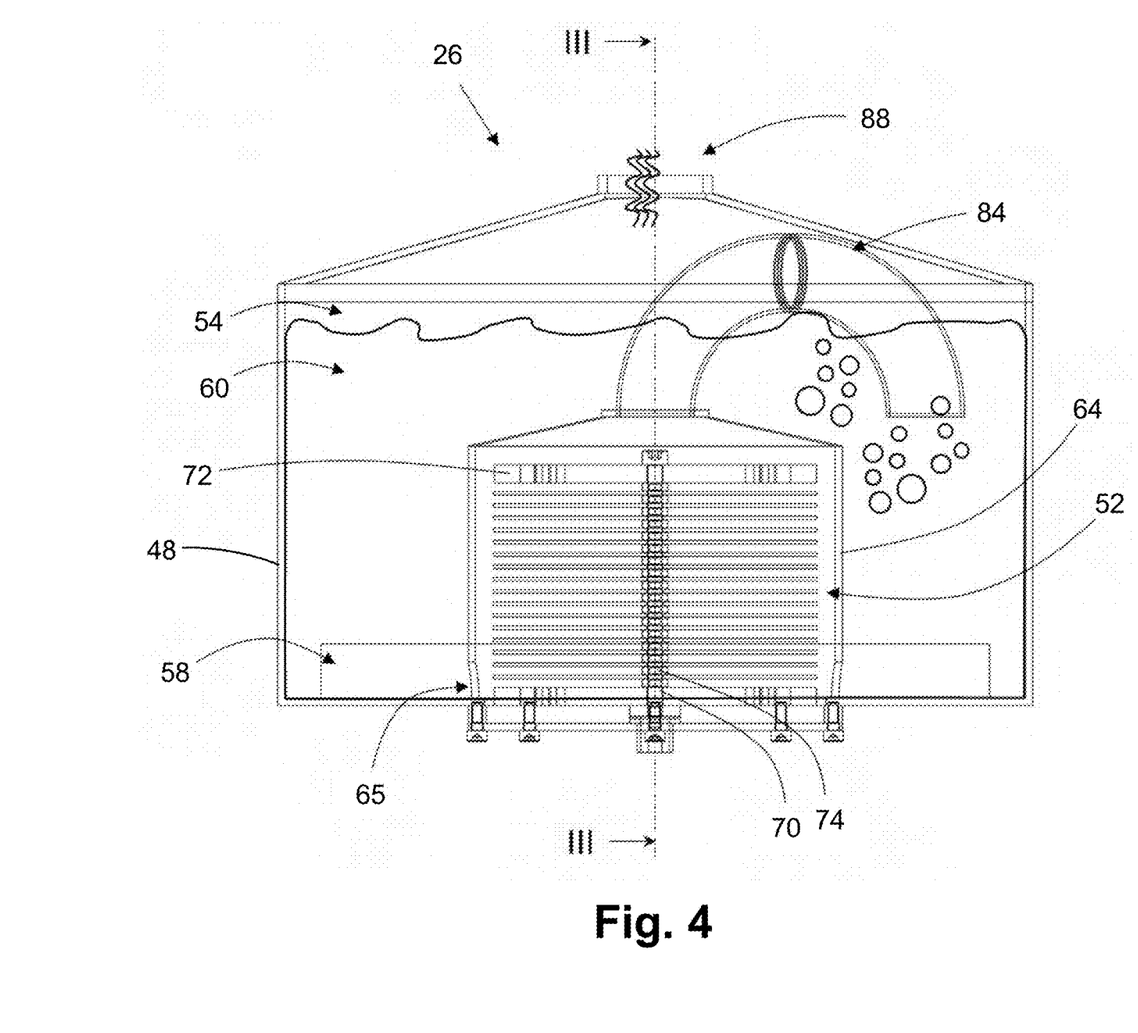
FIG. 4 is a sectional view along line IV-IV of the electrolytic cell of FIG. 3.

FIG. 3 is a schematic sectional view along a vertical plane through the two parallel vertical axes of cathode 50 and anode 52, along the line III-III of FIG. 4. FIG. 4, in turn, is a sectional view along the line IV-IV of FIG. 3. As shown in FIGS. 3 and 4 electrolytic cell housing 48 is divided into two partial electrolytic cells 54 by a partition 56, and has at least one connection 58 in the lowest region of electrolytic cell housing 48 (see FIG. 4). Connection 58 can also be formed by a supply for the electrolyte liquid 60, such that connection 58 is divided directly below electrolytic cell housing 48. Such a connection 58 can also be designed as a connection opening or as a pipe.

Cathode 50 and anode 52 are each housed within separate electrode chambers 62, each defined by an electrode housing 64, and each disposed within an individual partial electrolytic cell 54 within electrolytic cell housing 48. That is, the electrode housings 64 for each of cathode 50 and anode 52 are on opposite sides of partition 56 within electrolytic cell housing 48. Each electrode chamber 62 is connected to the electrolytic cell housing 48, and therefore to electrolyte liquid 60, via one or more exchange openings 65 or pipes in such a way that an electrolyte exchange takes place automatically.

In the exemplary embodiment shown, cathode 50 can include a plurality of individual electrodes 66 that can have the form of thin sheet metal plates. The plate-shaped electrodes 66 may have the outline of regular squares, hexagons, octagons, or, preferably, circles. Particularly when used for the electrolysis of water, cathode 50 and anode 52 can include iron electrodes, preferably in the form of steel electrode plates.

Each of the electrodes 66 can be retained in position by an appropriate holding mechanism. In the illustrative example shown, each of electrodes 66 defines two apertures 68 through each of which a tension rod 70 is inserted. In this embodiment the distance between adjacent electrode plates 66 can be defined by inserting an electrode spacer 74 between adjacent electrode plates 66, where the spacer is similarly retained by tension rod 70. Similarly, insulator plates 72 can be provided below the lowest electrode plate and above the uppermost electrode plate, where insulator plates 72 likewise define corresponding apertures for accepting tension rods 70.

Tension rods 70 can optionally include threading, or at least threaded end regions that project beyond the insulator plates 72 at the top and bottom of the electrode plate stack, so that by screwing on an appropriate fastener electrode plates 66 and spacers 74 can be pressed together, ensuring a robust and reliable electrical contact. Alternatively, tension rods 70 can be threaded substantially along their entire lengths, so that spacers 74 and insulator plates 72 can be threaded onto tension rods 70.

Preferably tension rods 70 and spacers 74 are each made of an electrically-conductive material, so that the necessary electrical connection to the electrode plates 66 can be made by coupling to conductive tension rod 70. In this way an adequate electrical separation of the electrode potential from the Electrode housing 64, the electrolytic cell housing 48, etc. can be readily carried out at the discretion of a person skilled in the art.

Anode 52 can have an electrode structure that is the same or different from the structure described for cathode 50. Typically, the electrode structure of each of anode 52 and cathode 50 will be substantially analogous to that of the other.

Each electrode chamber 62 generally corresponds to the interior volume defined within and beneath the corresponding electrode housing 64. Electrode housings 64 can have any of a variety of shapes and configurations, which can be the same or different, provided that electrode housing 64 is shaped so that as gases are evolved at the electrodes within the housing, and the gases form bubbles in electrolyte liquid 60, the resulting gas bubbles of hydrogen 76 ($H_2$) and oxygen 78 ($O_2$) are retained within the housing, and directed to a single exit in an upper portion 80 of electrode housing 64. Preferably, each electrode housing 64 is open at the bottom via one or more exchange openings 82 or pipes, so that electrolyte liquid 60 is readily exchanged between the electrode chamber 62 and electrolytic cell housing 48 automatically.

Additionally, each electrode chamber 62 is shaped so that the gas bubbles of $H_2$ 76 and $O_2$ 78 formed in the electrolyte liquid 60 within the chamber will rise upward to the centers of the respective electrode housings 64. For example, electrode housing 64 can have an approximate bell shape; that is, electrode housing 64 can include a cylindrical jacket topped by a conical upper portion, as shown in FIGS. 2-5. Alternatively, electrode housing 64 can include a prismatic jacket topped by a truncated pyramid.

Each electrode housing 64 typically incorporates a gas pipe 84 at upper portion 80 of electrode chamber 62, coupled to the single exit where evolved gases leave the electrode chamber. The pair of approximately U-shaped gas pipes 84 coupled to the upper ends of the electrode housings 64 are configured to separately direct the hydrogen and oxygen gas formed by water electrolysis into the electrolyte liquid 60 held within electrolytic cell housing 48, as through an inverted siphon. This serves as a security in the event of a flashback of a combustion reaction and makes a separate bubbler superfluous. Electrolytic cell housing 48 is closed by a cover plate 86 that defines a pair of gas outlets 88 for the evolved oxygen and hydrogen, respectively.

As shown in FIG. 4, the arrangement of gas pipe 84 can be seen clearly. In general, each gas pipe 84 functions as an inverted gas siphon, with an ascending portion, a curved or angled portion, and a descending portion, which can have the shape of an upside-down "U." The "U" does not have to be symmetrical; its legs do not have to run parallel, and the connection does not have to be circular, as the proper functioning of the gas siphon depends only on the vertical arrangement of the highest point of the inlet opening, lowest point of the apex, and highest point of the outlet opening to achieve reliable separation. It should be appreciated that movements of the electrolyte or the entire device must be taken into account. The volume ratio between electrolytic cell housing 48 and the Electrode chambers 62 or cover plate 86 is not necessary; it is a consequence of the circular cylindrical electrolytic cell housing 48 (FIG. 2) and can be changed as required for the particular use case to be adapted.

It should be appreciated that in place of the "U-shaped" gas pipes 84 disclosed here, the electrolytic cells of the present disclosure can instead employ a kind of screen with an at least partially annular (horizontal) slot, an inverted culvert (gas siphon), can be provided above the openings in the upper portion of Electrode housing 64. It is only consequential that the evolved gas bubbles exit below the liquid surface of electrolyte liquid 60 in the case of hydrogen gas 76, and that this surface (in the case of both gases) be disposed at a distance from the gas outlet 88. The open or closed loop control of the electrolyte liquid supply required for the electrolytic cell of the disclosure is conventional, requires no additional explanation. Similarly, the preparation and possibly the regeneration of electrolyte liquid would be well known to a skilled artisan, and need not be repeated here.

As shown in the disclosed embodiment, both of the evolved gases are released by U-shaped gas pipes 84 under the surface of electrolyte liquid 60 within electrolytic cell housing 48. In some cases, this is not necessary with evolved oxygen. In the case of evolved hydrogen, however, this construction fulfills the function of a so-called bubbler. This replaces the requirement of a separate vessel to serve in this capacity, sometimes referred to as a gas scrubber, which actually has little to do with cleaning but rather serves as a safety measure in the event of a flashback of a flame, as protection for the electrolytic cell 26.

The evolved gases emerge from the electrolyte liquid outside of electrode housings 64, but within electrolytic cell housing 48 and beneath cover plate 86. The evolved hydrogen and oxygen gases remain separated by partition 56 within electrolytic cell housing 48, and are drawn off separately through the gas outlets 88 and passed on appropriately.

When the presently disclosed electrolytic cell is used in a motor vehicle, such as an automobile, electrolyte liquid 60 will necessarily often be in motion, as indicated in FIGS. 3 and 4, and the electrolyte liquid surface forms waves which can be described as large in comparison to the size of the electrolytic cell 26. In order for electrolytic cell 26 to function properly, it is advantageous for the liquid level of electrolyte liquid 60 to always remain above the level of the opening of gas pipe 84 (or the slot of the gas siphon for hydrogen, if used) and sufficiently deep beneath gas outlet 88 in cover plate 86 of electrolytic cell 11 that no noticeable amounts of electrolyte liquid 60 become entrained by the escaping gas, especially the evolved hydrogen. It should also be noted that the introduction of a specific amount of water into intake tract 12 and therefore engine 10 is typically not harmful. The electrolyte liquid 60, typically water, can be prepared by adding additives to increase the conductivity and suitably change other properties, as is known in the prior art.

As discussed above, cathode 50 and anode 52 do not necessarily have to be of the same design, although this may be advantageous for reasons of production and storage efficiency. For example, electrode plates 66 are not required to have a circular shape, even if this may be advantageous for electrotechnical reasons. If square or hexagonal electrode plates are used, any associated waste of plate material may be minimized. This may be particularly advantageous when, for whatever reason, a more expensive material than steel is used to manufacture the electrode plates. It is also not required to employ two tension rods 70 for each electrode; one tension rod, disposed for example at the center of the electrode plates 66, may be sufficient. Alternatively, under certain circumstances it may be advantageous to provide more than two tension rods. A skilled artisan can easily optimize the design of each electrode plate stack in view of the guidance provided herein, and the knowledge generally available in the field of application.

Figure 5A:
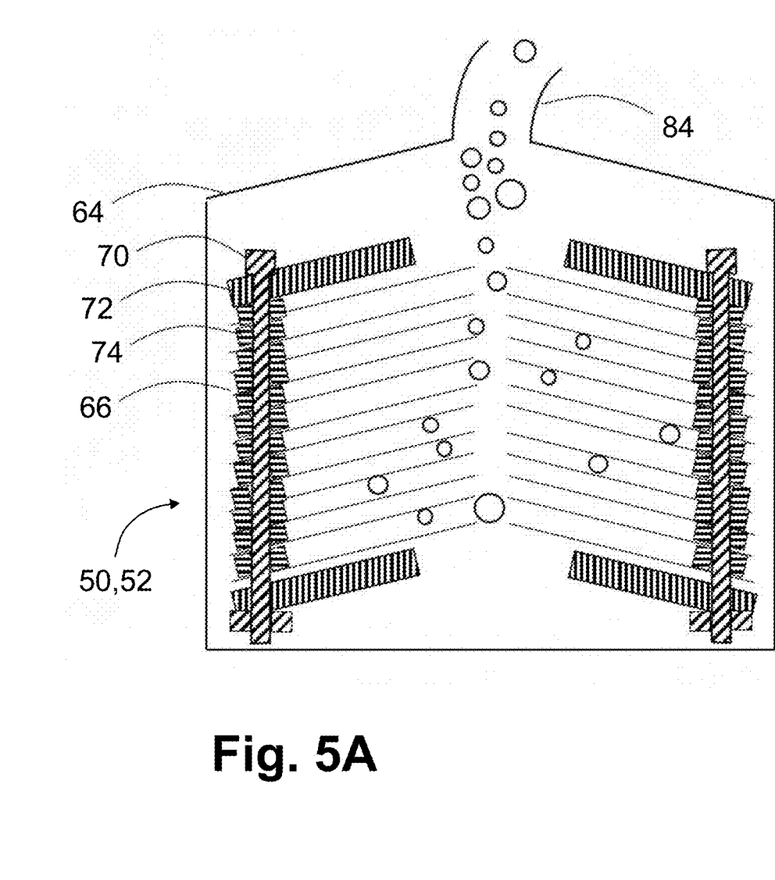
FIGS. 5A and 5B depict two variants of the shape of the electrodes in an exemplary electrolytic cell.
Figure 5B:
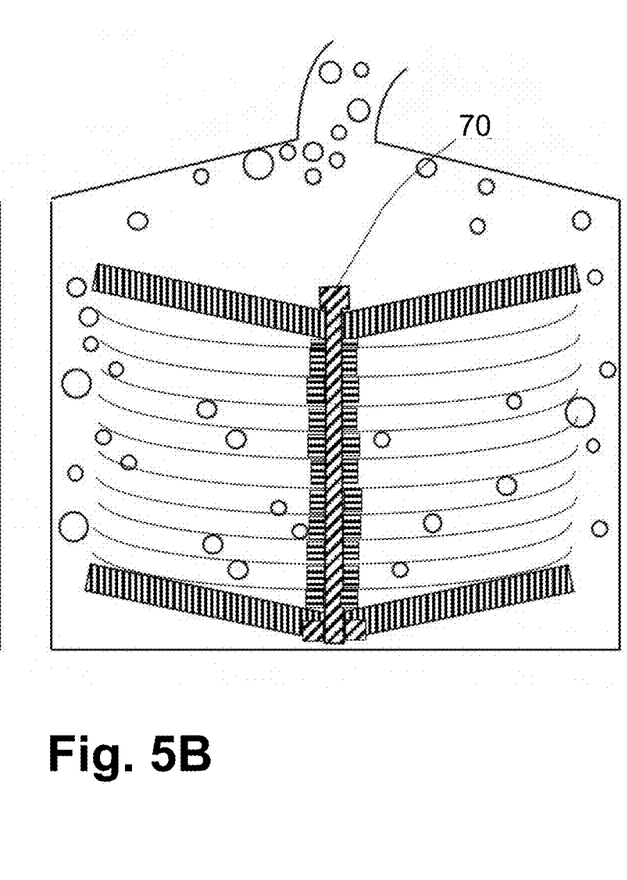

In an alternative embodiment of the disclosed electrolytic cell, as shown in FIGS. 5A and 5B, it is possible to use electrode plates 66 that possess a slightly conical or dome-shaped configuration, rather than the flat electrode plates shown in FIGS. 3 and 4. In this configuration, the choice of using only a single tension rod 70 may be particularly advantageous. Instead of a dome-shaped design, conical electrode plates, similar in configuration to insulator plate 72 shown in FIGS. 3 and 4, may also be used. In particular, FIG. 5A depicts an electrode housing 64 that contains a stack of conical, annular electrode plates 66, each having central opening to provide a gas outlet, which may improve the collection of the evolved gas bubbles in upper portion 80 of electrode chamber 62 and into gas pipe 84. The annular electrode plates 66 are preferably held and contacted by at least three tension rods 70 evenly distributed over the circumference of the electrode stack. As shown, the illustrated embodiment includes four such tension rods 70.

By providing an incline and/or including holes in the electrode plates, and optionally also insulator plates 72, the peel-off of the formed gas bubbles may be improved. Typically, this is a consideration that is not as significant for use in motor vehicles due to the inevitable vibrations occurring during operation, in contrast to electrolytic cells that remain stationary. Such shapes and configurations can also be employed analogously with polygonal electrode plates 66 in order to achieve the described effect. For the sake of simplicity, a detailed illustration of the electrical connection of cathode 50 or anode 52 is not shown, as the technical requirements of doing so would be well known, and could be readily carried out by a skilled artisan.

A particularly favorable design for the electrode stack, especially for use in a vehicle or motor vehicle, is the use of the conical or tent-like design of cover plate 86 for each gas in the electrolytic cell housing 48, so that the gas outlets 88 are disposed at the highest point of a dome formed underneath cover plate 86. This precaution provides an undisturbed path for evolved gases to escape, and ensures reliable separation of droplets of the electrolyte, even if the vehicle employing the electrolytic cell is positioned on sloping ground.

In the representations of the drawings, the feed line for the electrolyte and the electrical supply are not specifically drawn. For this aspect of the invention any suitable option known in the prior art may be used in combination with the electrolytic cells of the present disclosure.

The electrolytic cells of the present disclosure are not limited to the embodiments specifically illustrated and described herein, but may be modified in various ways without departing from the spirit and scope of the invention. For example, the electrolysis chambers can be designed differently, the gas siphons and gas pipes can be combined, and the outlines and heights of various cell components can be adapted to the individual installation situation, if necessary. Additions can also be made, for example by providing an intermediate chamber for separating entrained electrolyte, or the buffer tank 28 may be forced to flow through and also serve this purpose, among other modifications.

EXAMPLES

This section describes additional aspects and features of the disclosed electrolytic cells presented without limitation as a series of paragraphs, some or all of which can be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. Electrolytic cell (26), more particularly for use in a motor vehicle, for electrolytic decomposition liquid of water into gaseous hydrogen (76) and oxygen (78), comprising an electrolytic cell housing (48) in which an electrolyte liquid (60) is filled, comprising an open or closed loop control device (38) for the supply of electrolyte liquid, and comprising a cathode (50) and an anode (52), which are each separately arranged in an electrode housing (64), characterized in that the electrolytic cell housing (48) is divided by a partition (56) into two partial electrolytic cells (54), a connection (58) being provided in the bottom region of the electrolytic cell housing (48), in that the two electrode housings (64) are each arranged in one of the partial electrolytic cells (54), in that at least the electrode housing (64) with the cathode (50) leads into an inverted gas syphon in the uppermost region of the electrode housing, in that the open or closed loop control device (38) is configured so that the outlet opening of which gas syphon is held in the electrolytic cell housing (48) completely below the liquid level of the electrolyte liquid (60), and the electrolytic cell housing (48) has a separate gas outlet (88) for each of the gases (76, 78), which gas outlet is arranged at a vertical distance above the liquid level of the electrolyte liquid (60).

A2. Electrolytic cell according to paragraph A1, characterized in that the electrode housing (64) has a cylindrical jacket with a conical upper part or a prismatic jacket with a truncated pyramid.

A3. Electrolytic cell according to either paragraph A1 or paragraph A2, characterized in that the inverted gas syphon is a pipeline (84) with an ascending part, a curved or angled part, and a descending part, optionally in the form of an upside-down "U."

A4. Electrolytic cell according to any of paragraphs A1 to A3, characterized in that the electrolytic cell housing (48) forms a dome below each of its gas outlets (88).

A5. Electrolytic cell according to any of the preceding paragraphs, characterized in that the cathode (50) and the anode (52) have electrode plates (66) which have a square, regularly hexagonal, or regularly octagonal or circular outline.

A6. Electrolytic cell according to any of paragraphs A1 to A4, characterized in that the cathode (50) and the anode (52) have electrode plates (66) which are designed in the shape of a truncated cone, a truncated pyramid, or a dome.

As used herein, the terms "front," "back," "above," "below" and so on are used in the generally accepted form and with reference to the object in its usual use position. This means that the gas is above the liquid, that "transversely" to a direction means a direction that is substantially rotated by 90°, that a bottom of a standing container would be on the ground, and the like.

It should also be noted that in the description and the claims, terms such as the "lower region" of a container, reactor, filter, structure, or device or, more generally, an object refer to the lower half and in particular the lower quarter of the overall height; "lowermost region" refers to the lowermost quarter and in particular an even smaller part, while "central region" refers to the central third of the overall height (width-length). All these terms have their generally accepted meaning, applied to the intended position of the object under consideration.

In the description and in the claims, the term "substantially" means a deviation of up to 10% of the stated value, if physically possible, both downward and upward, otherwise only in the appropriate direction; in the case of degrees (angle and temperature), this means ±10°.

All given quantities and percentages, in particular those relating to the limitation of the invention, insofar as they do not relate to specific examples, are understood to have a tolerance of ±10%; accordingly, for example: 11% means: from 9.9% to 12.1%. With designations such as "a solvent," the word "a" is not to be considered to be a numeral, but rather a pronoun, unless the context indicates otherwise.

The term: "combination" or "combinations," unless otherwise stated, means all types of combinations, starting from two of the relevant components up to a plurality or all of such components. The terms "containing," "including," and "consisting of" should be considered non-exclusive and open-ended, and not intended to exclude additional, unrecited elements or method steps. Statements such as "more than five" explicitly include any natural number greater than five.

Terms such as "first", "second", and "third" are used to distinguish or identify various members of a group, or the like, and are not intended to show serial or numerical limitation.

The individual features and variants specified in the individual embodiments and examples can be freely combined with those of the other examples and embodiments and in particular can be used for characterizing the invention in the claims, without necessarily including the other details of the relevant embodiment or of the relevant example.

CONCLUSION

The disclosure set forth above can encompass multiple distinct examples with independent utility. Although each of these has been disclosed in one or more illustrative form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties can be claimed in applications claiming priority from this or a related application. Such claims, whether broader, narrower, equal, or different in scope to the original claims, also are regarded as included within the subject matter of the present disclosure.

What is claimed is:

1. An electrolytic cell for electrolytic decomposition of water into gaseous hydrogen and oxygen, comprising:

an electrolytic cell housing in which an amount of electrolyte liquid having a liquid level is disposed, wherein a connection to an electrolyte liquid supply is provided in a bottom region of the electrolytic cell housing;
wherein the electrolytic cell housing is divided by a partition into two partial electrolytic cells;
an open or closed loop control device for regulating the amount of the electrolyte liquid in the electrolytic cell housing;
a cathode disposed in a first electrode housing, the first electrode housing being arranged in one of the partial electrolytic cells;
an anode disposed in a second electrode housing, the second electrode housing being arranged in the other of the partial electrolytic cells;
such that at least the first electrode housing is coupled at its uppermost portion to an inverted gas siphon having an outlet opening within the electrolytic cell housing;
wherein the open or closed loop control device is configured to regulate the amount of electrolyte liquid in the electrolytic cell housing so that the outlet opening of the inverted gas siphon is held completely below the liquid level of the electrolyte liquid; and
wherein the electrolytic cell housing includes separate gas outlets for evolved hydrogen and oxygen gases, and each gas outlet is arranged at a vertical distance above the liquid level of the electrolyte liquid.

2. The electrolytic cell of claim 1, wherein at least one of the first and second electrode housings includes a cylindrical jacket having a conical upper portion.

3. The electrolytic cell of claim 1, wherein at least one of the first and second electrode housings includes a prismatic jacket with a truncated pyramidal upper portion.

4. The electrolytic cell of claim 1, wherein the inverted gas siphon includes a pipe having an ascending portion, a curved or angled portion, and a descending portion.

5. The electrolytic cell of claim 1, wherein the inverted gas siphon has the form of an upside-down "U".

6. The electrolytic cell of claim 1, wherein the electrolytic cell housing defines a dome below each of the gas outlets, such that each gas outlet is at an apex of its respective dome.

7. The electrolytic cell of claim 1, wherein the electrolytic cell housing includes a cover plate, and the cover plate defines each of the gas outlets for the evolved oxygen and hydrogen.

8. The electrolytic cell of claim 1, wherein each of the cathode and the anode include a plurality of electrode plates.

9. The electrolytic cell of claim 1, wherein each of the cathode and the anode include a plurality of electrode plates, the electrode plates having a square, a regularly hexagonal, a regularly octagonal, or a circular outline.

10. The electrolytic cell claim 1, wherein each of the cathode and the anode include a plurality of electrode plates, the electrode plates each having a shape of a truncated cone, a truncated pyramid, or a dome.

11. The electrolytic cell of claim 1, wherein the electrolytic cell is particularly configured for use in a motor vehicle.

12. The electrolytic cell of claim 1, wherein the electrolytic cell is particularly configured for use in an automobile.

* * * * *